Sept. 1, 1964 ISAMU TSUJI ETAL 3,146,943
BIRTH CONTROL INDICATOR
Filed Jan. 4, 1963
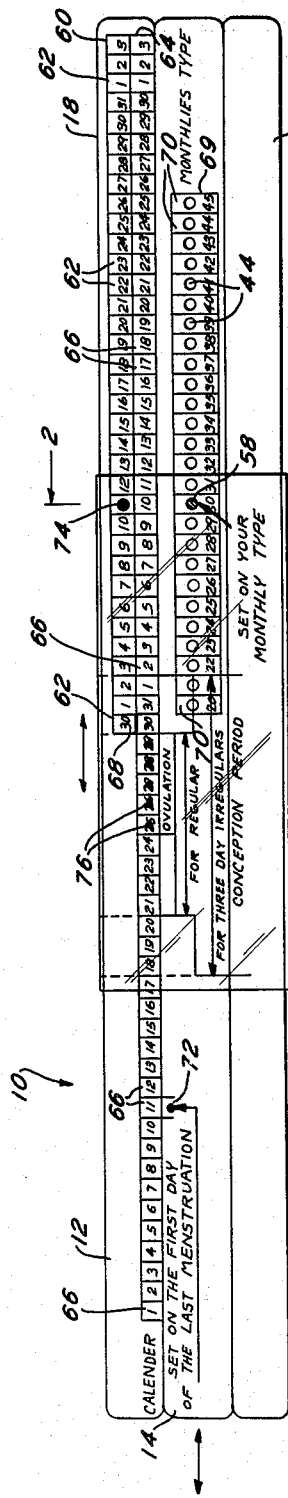
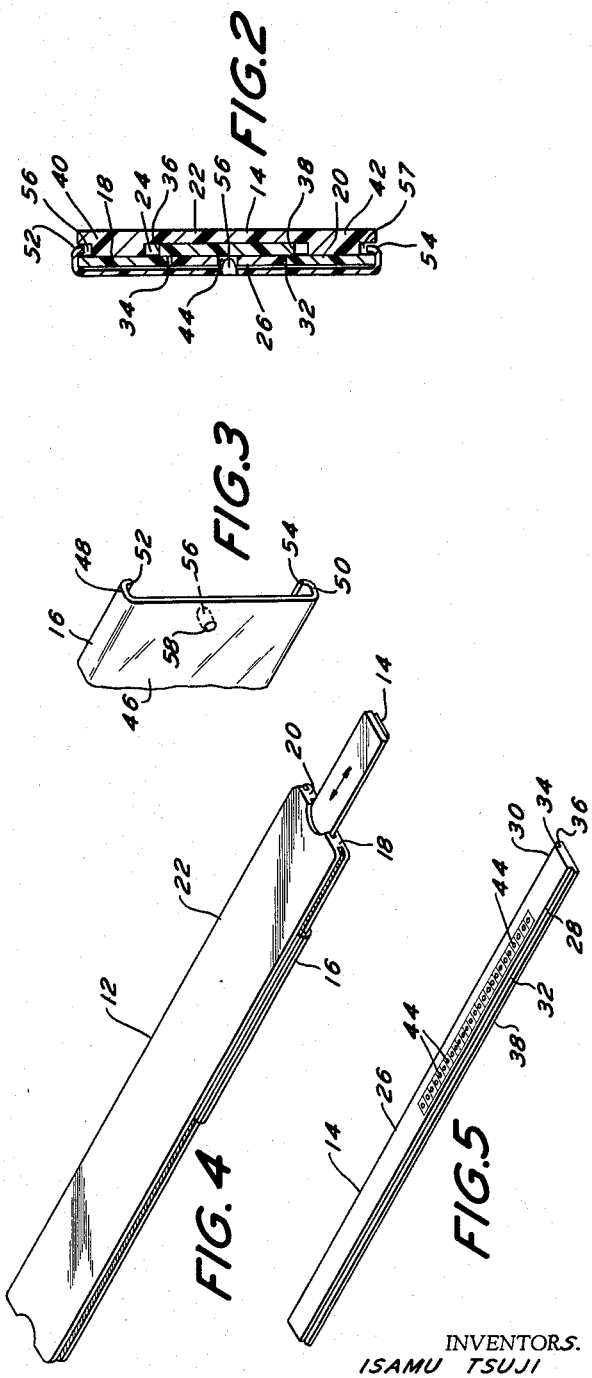
INVENTORS.
ISAMU TSUJI
TOSHIO IKEUCHI
BY
Caesar and Rivise
ATTORNEYS.

United States Patent Office 3,146,943
Patented Sept. 1, 1964

3,146,943
BIRTH CONTROL INDICATOR
Isamu Tsuji, 14 Tachibana-cho, and Toshio Ikeuchi, 386 Asake-machi, both of Kofu, Japan
Filed Jan. 4, 1963, Ser. No. 249,394
1 Claim. (Cl. 235—70)

This invention relates to a birth control indicator and has as its prime objective the provision of a novel instrument which will quickly and simply calculate certain birth control data, such as, the conception period and the first day of the next monthly cycle.

The concept of a determinable conception period of a woman is embodied in the Oginow-Knaus theory of ovulation and also in the so-called "rhythm" system. In accordance with these theories there are certain predictable days during a woman's monthly cycle in which conception can occur.

These days can be simply and quickly calculated by many women, but others have difficulty, and still others desire the reliability of some handy mechanism or the fact that their own calculation could be confirmed by some handy mechanism.

It is accordingly an object of the present invention to provide a birth control indicator which may be simply produced and easily used.

A further object of the present invention is to provide a birth control indicator which in addition to the foregoing will enable the first day of the next monthly cycle to be quickly calculated over a wide range of monthly types, taking into account whether the month has thirty or thirty-one days and also whether the women is regular or is a three day irregular.

The foregoing as well as other objects of the present invention are achieved by providing a birth control indicator which includes a fixed rule, a movable rule slidably secured within the fixed rule and a transparent cursor slidably mounted on the fixed rule and also slidable with respect to the movable rule or adapted to be locked thereto to slide therewith. The fixed rule has two scales printed thereon generally corresponding to thirty and thirty-one day months. The movable rule has a plurality of openings therein constituting a scale having divisions corresponding to a particular monthly type. The transparent cursor has a locking connector pin depending therefrom for engagement in one of the openings in the movable rule.

Other objects and many of the attendant advantages of this invention will be readily appreciated as the same becomes better understood by reference to the following detailed description when considered in connection with the accompanying drawings wherein:

FIG. 1 is an enlarged plan view of a fully assembled indicator constituting an embodiment of the present invention;

FIG. 2 is an enlarged sectional view taken along the lines 2—2 of FIG. 1;

FIG. 3 is a fragmentary perspective view of the cursor of the indicator of the present invention;

FIG. 4 is a rear perspective view on a reduced scale of the indicator of the present invention; and FIG. 5 is a perspective view on a reduced scale of the movable rule of the indicator of the present invention.

Referring now in greater detail to the various figures of the drawings wherein similar reference characters refer to similar parts, a birth control indicator embodying the present invention is generally shown at 10 in FIG. 1. Device 10 basically comprises a fixed rule 12, a movable rule 14 slidably secured within the fixed rule 12 and a transparent cursor 16 slidably mounted upon the fixed rule 12 and also either slidable with respect to the movable rule 14 or adapted to be locked thereto to slide therewith.

The fixed rule 12, as best indicated in FIGS. 1 and 2, comprises ledges 18 and 20 of a veneer-type plastic defining a slot 24 between them and the bridging section 22. The ledges 18 and 20 are fairly broad in order that the ledge 18 may accept printing for purposes which will be discussed hereinafter. Also, the inner edges of the ledges 18 and 20 extend into the slot 24 so that the movable rule 14 may be slidably engaged therein.

The movable rule 14 is best shown in FIGS. 4 and 5 and, as illustrated in FIG. 5, possesses a cross section of an inverted T. The movable rule 14 comprises a broad tableau 26 terminating in longitudinally extending vertical walls 28 and 30 which merge respectively into short horizontal ledges 32 and 34 which in turn terminate in short vertical walls 36 and 38.

As illustrated in FIG. 2, the ledges 18 and 20 of the fixed rule 12 are of a veneer-type material and are secured upon flange-like extensions 40 and 42 of the bridging section 22. As further illustrated in FIG. 2, each of the ledges 18 and 20 extend to some degree into the slot 24 and thus the movable rule 14 may be lockingly engaged endwise in the slot 24 in such a manner that the short horizontal ledges 32 and 34 are positioned immediately behind the inner surfaces of the ledges 18 and 20 and slide relative thereto in actual sliding contact with the inner surfaces of the extending ledges 18 and 20. Also, the vertical walls 28 and 30 of the movable rule 14 are in sliding contact with the inner end surfaces of the ledges 18 and 20. The broad tableau 26 of the movable rule 14 projects between the ledges 18 and 20 and its front surface lies in the same plane as the front surface of the ledges 18 and 20.

One significant feature of the present invention resides in the fact that a plurality of openings 44 are formed in the broad tableau 26. The function of the openings 44 will be described in greater detail hereinafter.

The transparent cursor 16 comprises a base 46 with integral flanges 48 and 50 extending therefrom and terminating in tips 52 and 54. As best shown in FIG. 2, the fixed rule 12 possesses longitudinal edge slots 56 and 57 which are partly defined by the outer end surfaces of the ledges 18 and 20. The tips 52 and 54 of the transparent cursor 16 are adapted to be slidably engaged in the slots 56 and 57. The cursor 16 is secured upon the fixed rule 12 by merely sliding the cursor 16 endwise upon the fixed rule 12 so that the tips 52 and 64 of the cursor 16 which may be of a somewhat resilient plastic enter the slots 56 and 58. The movable rule 14 is similarly secured to the fixed rule 12. In this respect the movable rule 14 is slid endwise with respect to the fixed rule 12 so that the short horizontal ledges 32 and 34 of the movable rule 14 are located immediately behind the inner surfaces of the ledges 18 and 20.

The various parts of the slide rule may be of a plastic or a plastic veneer or some similar smooth material in order that the sliding of the various parts with respect to each other will occur without binding and will take into account temperature and humidity changes.

The transparent cursor 16 further includes a connector pin 56 which projects rearwardly into the space defined by the flanges 48 and 50. As will be described in greater detail, the connector pin 56 is adapted to interfit into a particular one of the openings 44 in the movable rule 14 in order that the cursor 16 may be temporarily locked in a particular position with respect to the movable rule 16 in order to slide therewith. The manipulation of the connector pin 56 with the transparent cursor 16 may be facilitated by providing an attractive luminous point for locating purposes, such as, an imitation diamond sliver 58 secured upon the head of the pin 56.

Attention is now referred to FIG. 1 of the drawing. This figure shows that the ledge 18 of the fixed rule 12 has two scales formed thereon. The upper scale 60 has many divisions 62 each corresponding to a particular day of a thirty day month and then including a thirty-first day and three days of the next month. The lower scale 64 is also formed on the ledge 18 immediately beneath the scale 60. The scale 64 has many divisions 66 equal in size to divisions 62 and each corresponding to a day of a thirty-one day month, followed by a thirty day month and three days of the next month.

The lower scale 64 commences adjacent the left edge of the ledge 18 with a division 66 corresponding to the first day of the thirty-one day month. The scale 64 then advances from left to right, day by day, until the thirty-first day of the first month with the very next division of the scale being the number 1 corresponding to the first day of the second month. The scale 64 then continues with additional divisions 66 extending from the first day of the first month to the thirtieth day of the second month and then terminates in three final divisions 66 corresponding to the first three days of the third month.

As previously noted, the upper scale 60 is located immediately above the lower scale 64, but the upper scale 60 is somewhat smaller in range than the lower scale 64. This is because the upper scale is needed only for a thirty day month and since the first twenty-nine days of a month are of identical dates irrespective of the fact that the month is either a thirty or a thirty-one day month. The scale 60 commences from left to right with a first division 62 corresponding to the thirtieth day of a month. This division is located immediately above the division 66 corresponding to the thirtieth day of a thirty-one day month. The next division 62 corresponds to the first day of a new month and is located above the division 66 corresponding to the thirty-first day of the old month. The scale 60 then extends to the thirty-first day of the month and then terminates in three final divisions 62 corresponding to the first three days of a new month. A slightly heavier zig-zag line 68 is provided adjacent the divisions 62 and 66 each corresponding to the thirtieth day of a month in order to facilitate the location of either the thirty day month scale (scale 60) or the thirty-one day month (scale 64).

As previously noted, the movable rule 14 has openings 44 provided therein. Each of the openings 44 is positioned in a division 70 of another scale. Each division 70 is of the same general dimensions as the divisions 62 and 66. The divisions 70 correspond to the days in a particular menstrual monthly cycle and commence with a value of twenty days and advance one by one to a value of forty-five days.

Attention is called to the fact that the divisions 62, 66 and 70 are so laid out with respect to each other in a particular manner. Thus, when the initial setting 72 of the movable rule is established as shown in FIG. 1, the division 66 of the lower scale 64 which is located immediately above the initial setting 72 when added to any of the values of any of the divisions 70 of the movable rule 14 will yield the value on the scale 64 immediately above the division 70. For instance, as shown in FIG. 1, the indicator spot 72 corresponds to a division 66 having a value of eleven. This value of eleven when added to a division 70 having the value of twenty gives a total of thirty-one which is reflected by the division 66 immediately above the division 70 which has the value of twenty. This can be demonstrated with respect to any combination of the scales 64 and 66 except that once a total of thirty-one is exceeded on scale 64, the numbers 1, 2, 3, etc. follow.

As previously noted, the lower scale 64 generally serves for a thirty-one day month. Where the particular month involved is a thirty day month, the reader merely continues vertically to the upper scale 60 where it is to be noted that the days of the month are one day behind the days on the lower scale 64.

The purpose of the foregoing arrangement of scales is to enable the user to determine the first day of the next menstrual cycle. This is simply done by sliding movable rule 14 so that indicator spot 72 is just below the particular day on scale 64 corresponding to the first day of the last menstrual cycle. The cursor 16 is then adjusted so that connecting pin 56 enters a particular opening 44 corresponding to the woman's monthly type. This procedure may be reversed so that pin 56 is set first and then indicator spot 72 adjusted.

As shown in FIG. 1, indicator spot 72 is set beneath "11," this meaning that the woman's menstrual cycle commenced on the eleventh day of the month. The pin 56 is located in a hole 44 corresponding to a thirty day menstrual cycle.

The marker 74 on the cursor 16 is so positioned with respect to pin 56 that the marked 74 will indicate the first day of the next menstrual cycle. As shown in FIG. 1, the first day of the next cycle is the eleventh day of the next month if the present month is a thirty day month, or it is the tenth day of the next month if the present month is a thirty-one day month.

With the foregoing setting the period of ovulation for the regular woman and the three day irregulars is directly read on the cursor 16. This is because the cursor 16 contains two lines which are nine divisions or nine days apart corresponding to nine potentially fertile days somewhat in the middle of the menstrual month. The two lines are set a fixed distance from pin 56 which means the fertile days are a fixed distance from the end of the menstrual month as determined by the location of pin 56. Similar lines are provided for three day irregulars.

It is thus seen that the conception period and initial day of the next menstrual cycle may be simply and quickly calculated by virtue of the indicator of the present invention.

Obviously many modifications and variations of the present invention are possible in the light of the above teachings. It is, therefore, to be understood that within the scope of the appended claim, the invention may be practiced otherwise than as specifically described.

What is claimed as the invention is:

A birth control indicator comprising a fixed rule, a movable rule slidably secured to the fixed rule and a transparent, resilient, plastic cursor slidable with respect to said fixed rule and said movable rule, said cursor including a base in slidable contact with said fixed rule and movable rule, flanges extending from said base and terminating in an edge slidable in longitudinal slots in said fixed rule, veneer-type ledges being secured to said fixed rule, said fixed rule having a central slot adapted to slidingly receive said movable rule, said ledges extending into said slot to secure said movable rule, said movable rule having a plurality of openings formed therein, said cursor having a locking pin depending therefrom and adapted to be positioned in one of said openings, said locking pin depending interiorly between said flanges and wherein said locking pin may be located easily by virtue of a luminous point associated therewith whereby said cursor than slides along with said movable rule, said fixed rule having two aligned scales printed thereon, each of said scales being divided into equal divisions corresponding to a thirty day month and a thirty-one day month, said movable rule having a scale printed thereon which is additive to the scales on said fixed rule, said movable rule scale being divided into equal divisions equal to the divisions on said fixed rule and wherein one of said openings is located in each of said movable rule divisions, said movable rule divisions corresponding to a particular monthly type, said locking pin being located so as to correspond to the first day of the next monthly cycle as determined by the insertion of said pin in one of said openings, the periods of fertility being printed on said cursor and being located a fixed distance from said pin.

References Cited in the file of this patent
UNITED STATES PATENTS

| | | |
|---|---|---|
| 1,461,975 | Eaton | July 17, 1923 |
| 2,789,763 | Renaudin | Apr. 23, 1957 |
| 2,968,438 | Bachmann | Jan. 17, 1961 |
| 3,047,222 | Kasmann | July 31, 1962 |